United States Patent
McLaren et al.

(10) Patent No.: US 9,430,157 B2
(45) Date of Patent: Aug. 30, 2016

(54) CONTINUOUS RECORDING MULTICHANNEL DISK-BASED DATA LOGGING

(75) Inventors: Moray McLaren, Bristol (GB); Norman Paul Jouppi, Palo Alto, CA (US); Patrick Charles McGeer, Orinda, CA (US); Alvin AuYoung, Palo Alto, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 43 days.

(21) Appl. No.: 14/381,291

(22) PCT Filed: Feb. 29, 2012

(86) PCT No.: PCT/US2012/027056
§ 371 (c)(1),
(2), (4) Date: Aug. 27, 2014

(87) PCT Pub. No.: WO2013/130055
PCT Pub. Date: Sep. 6, 2013

(65) Prior Publication Data
US 2015/0095569 A1    Apr. 2, 2015

(51) Int. Cl.
*G06F 12/00* (2006.01)
*G06F 3/06* (2006.01)
*G06F 11/20* (2006.01)
*G06F 13/14* (2006.01)

(52) U.S. Cl.
CPC .......... *G06F 3/0611* (2013.01); *G06F 3/0613* (2013.01); *G06F 3/0614* (2013.01); *G06F 3/0616* (2013.01); *G06F 3/0617* (2013.01); *G06F 3/0635* (2013.01); *G06F 3/0659* (2013.01); *G06F 3/0683* (2013.01); *G06F 3/0688* (2013.01); *G06F 3/0689* (2013.01); *G06F 11/20* (2013.01); *G06F 11/201* (2013.01); *G06F 11/2002* (2013.01); *G06F 11/2017* (2013.01); *G06F 11/2038* (2013.01); *G06F 11/2041* (2013.01); *G06F 13/14* (2013.01)

(58) Field of Classification Search
CPC .. G06F 3/0614; G06F 3/0616; G06F 3/0617; G06F 3/0688; G06F 3/0689; G06F 11/20; G06F 11/2002; G06F 11/201; G06F 11/2017; G06F 11/2038; G06F 11/2041; G06F 13/14
See application file for complete search history.

(56) References Cited

U.S. PATENT DOCUMENTS 5,297,258 A    3/1994 Hale et al.
5,974,503 A   10/1999 Venkatesh et al.
(Continued)

OTHER PUBLICATIONS

Jian Yin et al., Scalable Real Time Data Management for Smart Grid, Dec. 12, 2011, Middleware 2011 Industry Track, pp. 1-6.*
(Continued)

*Primary Examiner* — Shawn X Gu
(74) *Attorney, Agent, or Firm* — Hewlett Packard Enterprise Patent Department (57) ABSTRACT

Continuous recording multichannel disk-based data logging apparatus. The apparatus includes a plurality of disk drives and an interface including a plurality of parallel inputs. The interface is responsive to data at the inputs to write the data on an active plurality of the disk drives, at least one disk drive being idle. The interface is responsive to a user request for data on one of the active disk drives to substitute an idle disk drive into the active plurality in place of that one, to read the requested data, and to cause that one to become idle.

17 Claims, 6 Drawing Sheets

(56) References Cited

U.S. PATENT DOCUMENTS

| | | | |
|---|---|---|---|
| 6,199,146 B1 * | 3/2001 | Pence | G06F 3/0608 |
| | | | 711/112 |
| 6,775,372 B1 | 8/2004 | Henits | |
| 2006/0031287 A1 | 2/2006 | Ulrich et al. | |
| 2007/0174676 A1 | 7/2007 | Tanaka et al. | |
| 2009/0310242 A1 | 12/2009 | McLeod et al. | |
| 2009/0313431 A1 * | 12/2009 | Takasugi | G06F 11/1076 |
| | | | 711/114 |
| 2010/0153634 A1 | 6/2010 | Fellinger et al. | |
| 2011/0126045 A1 | 5/2011 | Bennett | |

OTHER PUBLICATIONS

PCT Search Report/Written Opinion—Application No. PCT/US2012/027056 dated Nov. 9, 2012—11 pages.

* cited by examiner

CONTINUOUS RECORDING MULTICHANNEL DISK-BASED DATA LOGGING

BACKGROUND

Data logging systems typically record more than one channel of data simultaneously. For example, a system that captures data from a physical experiment may record parameters such as temperatures, displacements, velocities, pressures, and the like as provided by various transducers or other sensors. Another example of a data logging system is a system that records multiple video streams. Raid disk arrays are commonly used in such data logging systems. The logging of data may continue for a considerable period of time, and sometimes a user accesses some of the data before the logging has come to an end.

BRIEF DESCRIPTION OF THE DRAWINGS

The figures are not drawn to scale. They illustrate the disclosure by examples.

DETAILED DESCRIPTION

Illustrative examples and details are used in the drawings and in this description, but other configurations may exist and may suggest themselves. Parameters such as voltages, temperatures, dimensions, and component values are approximate. Terms of orientation such as up, down, top, and bottom are used only for convenience to indicate spatial relationships of components with respect to each other, and except as otherwise indicated, orientation with respect to external axes is not critical. For clarity, some known methods and structures have not been described in detail. Methods defined by the claims may comprise steps in addition to those listed, and except as indicated in the claims themselves the steps may be performed in another order than that given. Accordingly, the only limitations are imposed by the claims, not by the drawings or this description.

The systems and methods described herein may be implemented in various forms of hardware, software, firmware, special purpose processors, or a combination thereof. At least a portion thereof may be implemented as an application comprising program instructions that are tangibly embodied on one or more program storage devices such as hard disks, magnetic floppy disks, RAM, ROM, and CDROM, and executable by any device or machine comprising suitable architecture. Some or all of the instructions may be remotely stored and accessed through a communication facility; in one example, execution of remotely-accessed instructions may be referred to as cloud computing. Some of the constituent system components and process steps may be implemented in software, and therefore the connections between system modules or the logic flow of method steps may differ depending on the manner in which they are programmed.

Hard disk drives are often the most economical storage devices for recording large volumes of data in high-bandwidth data logging systems. It is desirable to maximize the write bandwidth so as to minimize the required number of disk drives or to facilitate the use of lower-speed, less expensive disk drives. Interleaving write and read operations on the same disk drive results in many seek operations back and forth between tracks then being written to and tracks containing data that is to be read. This in turn reduces the write bandwidth and causes excessive wear on the disk drive. There is a need for a way to improve the write bandwidth in data-logging systems that are subject to frequent read commands.

Figure 1:
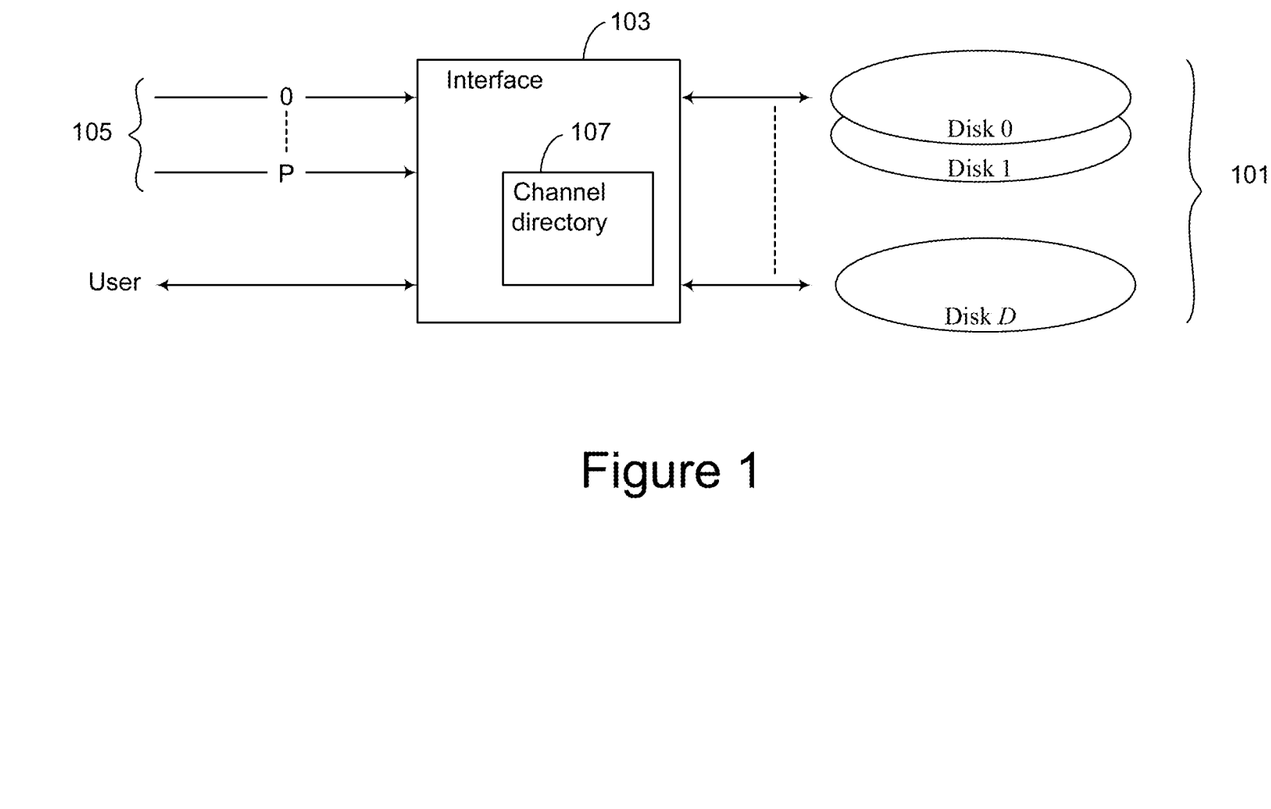
FIG. 1 is a block diagram of an example of continuous recording multichannel disk-based data logging apparatus.

An example of a multichannel disk-based data logging apparatus is shown in FIG. 1. The apparatus includes a plurality of disk drives 101 and an interface 103 including a plurality of parallel inputs 105. The interface is responsive to data at the inputs to write the data on an active plurality of the disk drives, at least one disk drive being idle. The interface is responsive to a user request for data on one of the active disk drives to substitute an idle disk drive into the active plurality in place of that one, to read the requested data, and to cause that one to become idle.

Figure 2:
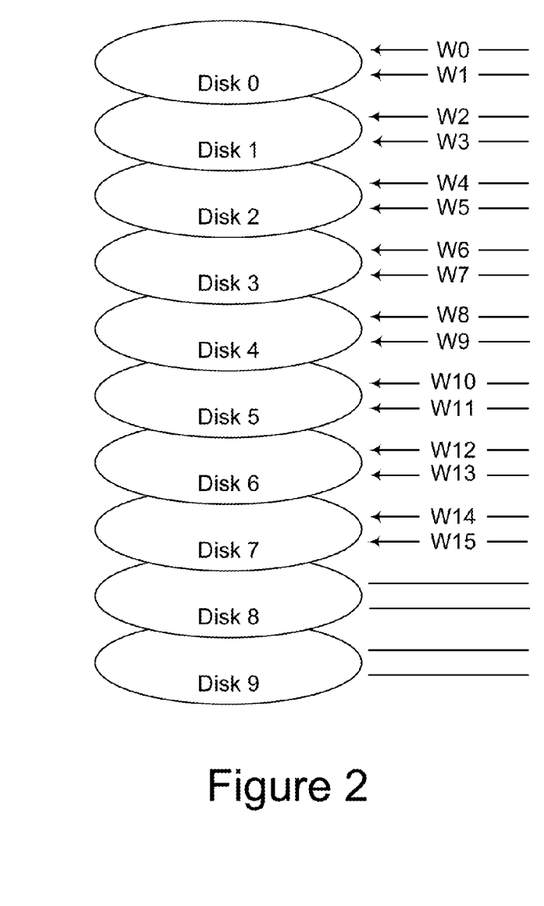
FIGS. 2 through 5 are block diagrams of examples of disk drives and data channels.

FIGS. 2 through 5 show an example having two more disk drives than inputs. Data are being written to the disk drives through 16 parallel channels designated W0 through W15. The data are being written to an array of ten disk drives numbered 0 through 9. In FIG. 2, data from channels 0 and 1 are being written to disk 0 through two communication lines that extend between the interface and disk 0, data from channels 2 and 3 are being written to disk 1 through two communication lines that extend between the interface and disk 1, and so on. Disks 8 and 9 are idle, and communication lines that extend between the interface and disks 8 and 9 are not carrying any data.

Figure 3:
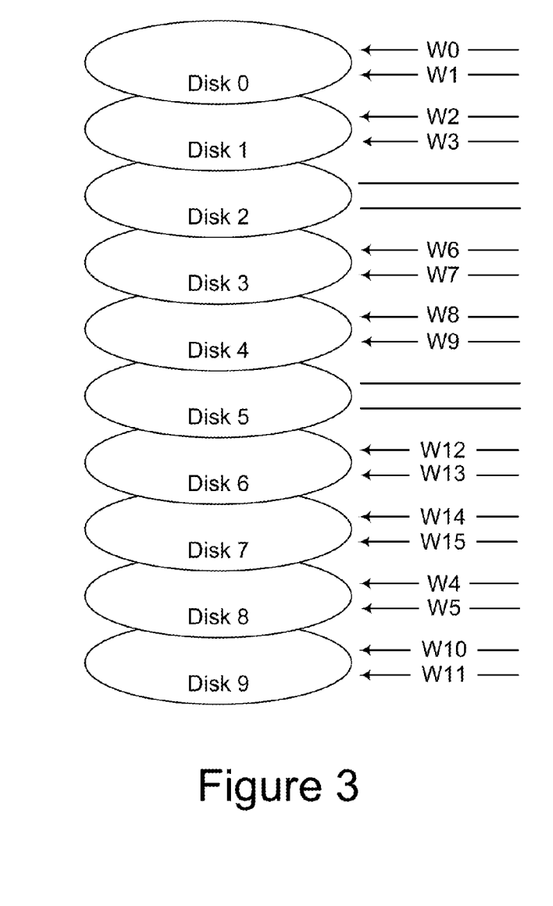

In FIG. 3, the interface has received a request to read data that have previously been recorded on disk 2 (channel 4) and on disk 5 (channel 11). Accordingly, disk 8 has been substituted for disk 2 by rerouting write channels 4 and 5 from the disk 2 communication lines to the disk 8 communication lines. Similarly, disk 9 has been substituted for disk 5 by rerouting write channels 10 and 11 from the disk 5 communication lines to the disk 9 communication lines.

Figure 4:
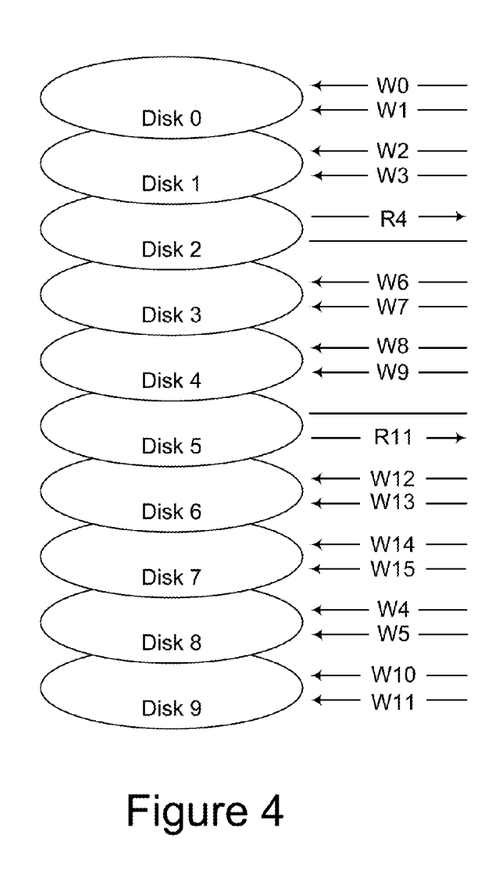

FIG. 4 shows the read operation to retrieve the requested data taking place at the same time as data are continuing to be written. The requested data are being accessed over read channel 4 (designated R4) through one of the disk 2 communication lines, and over read channel 11 through one of the disk 5 communication lines. Meanwhile, all 16 write channels are being written on (in order of increasing write channel numbers) disks 0, 1, 8, 3, 4, 9, 6, and 7.

Figure 5:
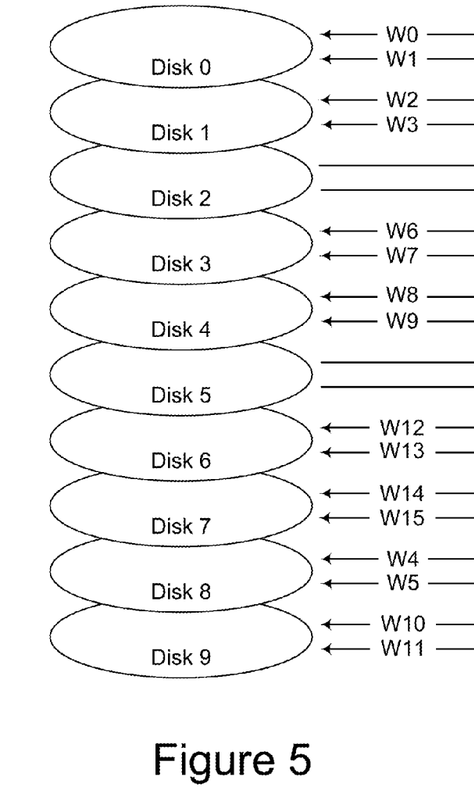

In FIG. 5, the read operation has ended, as indicated by the communication lines between the interface and disks 2 and 5 no longer carrying any data. Disks 2 and 5 are now idle. Thereafter, if another channel on another disk is to be read, in some examples write logging is transferred to one of the newly-idle disk drives, overwriting the oldest data on that idle disk first. In other examples, writing on an idle disk commences at a place on the idle disk that corresponds with the place on the disk now being read from at which writing left off; this approach may reduce fragmentation, and no loss of data occurs if (as is often the case) the data on all of the idle disk is old and no longer needed.

To provide security against data failure, RAID 5 operation may be supported. In this case, parity across some group of drives, (say disks 0 to 3) is written to an additional drive. In the absence of drive failure, data are read as described above. If the read target disk drive fails, data for that drive may be recovered by accessing the data in the four other disk drives in its raid parity group.

The interface 103 may actually comprise multiple disk interface devices. Serial advanced technology attachment (SATA) computer bus interface devices, or serial attached SCSI (SAS) interface devices (SCSI refers to the small computer system interface specification) may be used. An interface device may support one or several disk drives, and therefore several channels may be allocated to each drive through one interface device. The maximum number of channels per drive may be determined such that the total bandwidth is less than the lowest sustained write rate for a disk (the sustained write rate is the rate for writing to tracks closest to the center of the drive). In the example shown in FIGS. 2 through 5, the interface 103 comprises ten disk interface devices (not individually shown), one for each of the disk drives. Each interface can carry two channels.

In this example, data are written to blocks on each disk drive in the innermost track first, working outwards to the outer tracks so as to minimize the number of full head seeks. When the outermost track is full, the writing process wraps round, with the oldest data being overwritten. In this way a full head seek is required only once for each write of the entire disk. As noted above, in other examples, when writing begins on an idle disk, the writing may begin at about the same position on the idle disk as the position that was being written to on the previous disk just before writing stopped on that disk.

A channel directory 107 records a dynamic mapping of channels to drives and logs the point in time at which data logging for a channel is transferred to another drive. The channel directory 107 may comprise flash memory, RAM, or other physical memory device. A physical channel directory may be omitted, and instead the dynamic mapping may be written to one of the disk drives in the array or to a separate disk drive (not shown in FIG. 1).

The inputs 105 may comprise sensor connection ports. For example, one such port may be configured for connection to a temperature sensor, another for connection to a pressure sensor, and so on. The inputs 105 may comprise data inputs that may be connected to a source of digital data, for example a separate computer system.

In some examples, once a disk has been read from, it is placed last in the idle list. Since read requests are sometimes clustered, if another read request for data on that disk arrives shortly after the first read request has been completed, the disk will be available, no interruption of writing need take place, and only minimal track seeking will be needed.

In the example illustrated in FIGS. 2-5, eight disks (initially disks 0 to 7) are shown as being written to, and two disks (initially disks 8 and 9) are shown as being idle. In other examples (not illustrated) data may be written to more or less than eight disks, and more or less than two disks may be idle. The number of idle disks may even exceed the number of active disks.

Figure 6:
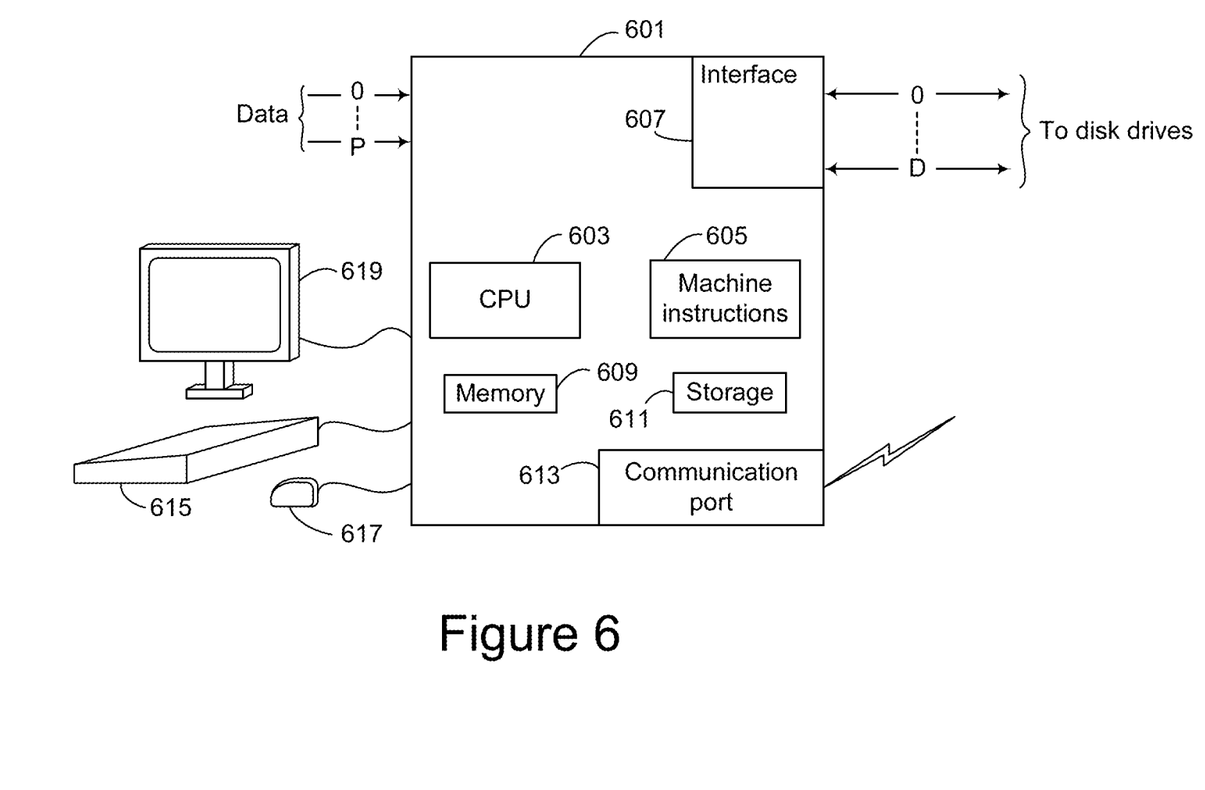
FIG. 6 is a block diagram of another example of continuous recording multichannel disk-based data logging apparatus.

Referring to FIG. 6, the interface may comprise a computer system generally 601. In the illustrated example, the computer system includes a processor 603 in communication with the inputs and the disk drives. Instructions 605 program the processor to write input data to the active disk drives, to substitute an idle disk drive in place of one of the active disk drives that contains requested data, and to cause that one to become idle after the requested data has been read. The computer system may include an interface device 607, for example one or more devices such as the SATA or SCS interface devices discussed previously, that handles communication between the processor 603 and the disk drives.

The instructions may reside in a memory 609 or in storage 611 such as a hard disk or a hard-wired instruction unit, or the instructions may be remotely stored and communicated as needed through a communication port 613.

The user that requests data be read may comprise an application in the computer system. Such an application may reside in the memory 609 or the storage 611. Or an application may be remotely located and may communicate with the computer system through the communication port 613 or some other suitable means.

The computer system may include one or more manual input devices such as a keyboard 615 and a mouse 617. A user may command a read of data on the disk drives through these input devices. An output device such as a monitor 619 may be provided.

Figure 7:
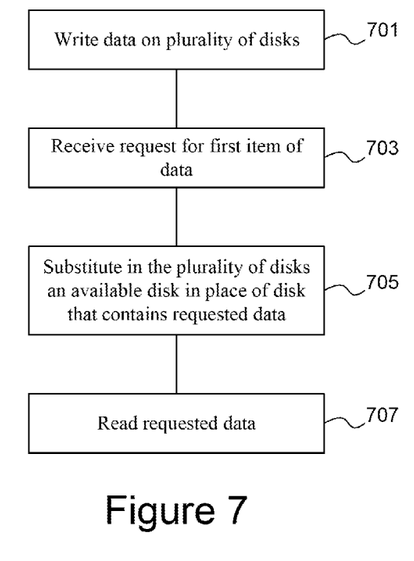
FIG. 7 is a flowchart of an example of a disk-based method of continuously recording multichannel data.

An example of a disk-based method of continuously recording multichannel data is shown in FIG. 7. The method includes writing (701) data on a plurality of disk drives, receiving (703) a request to read a first item of data, substituting (705) in the plurality of disk drives an available disk drive in place of that disk drive which contains the first item of data, and reading (707) the first item of data.

Figure 8:
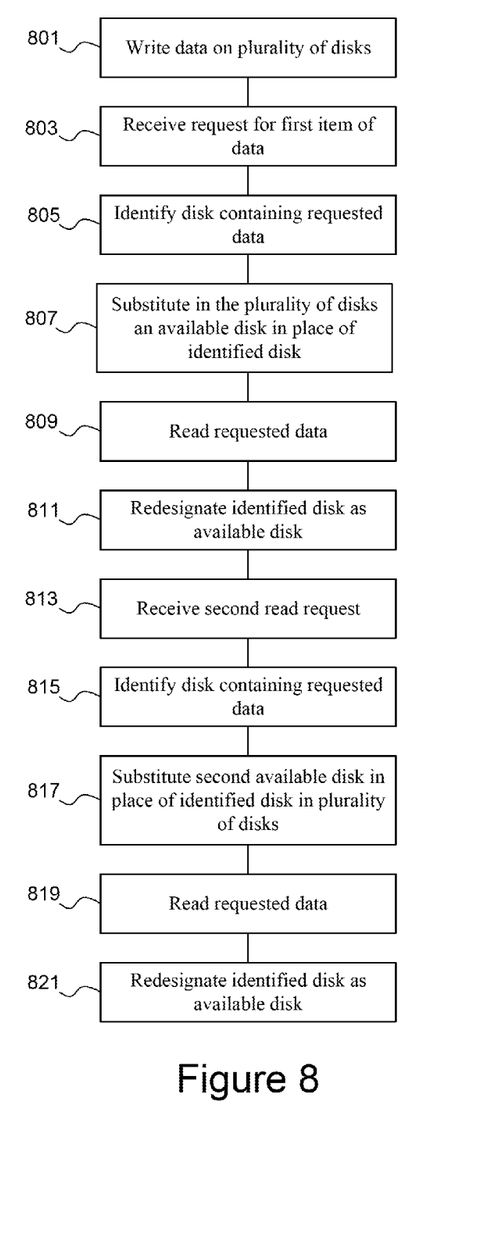
FIG. 8 is a flowchart of another example of a disk-based method of continuously recording multichannel data.

Another example, shown in FIG. 8, includes writing (801) data on a plurality of disk drives, receiving (803) a request to read a first item of data, and identifying (805) that disk drive which contains the first item of data. Identifying the disk drive may be accomplished by reference to a disk mapping or by some other suitable process, or the request may itself contain the identification in which case no further identification is needed. Next is substituting (807) in the plurality of disk drives an available disk drive in place of that disk drive which contains the first item of data, reading (809) the first item of data. That disk drive which contains the first item of data is redesignated (811) as an available disk drive. A request to read a second item of data is received (813) and as before the disk drive that contains the requested data is identified (815). A second available disk drive is substituted (817) in the plurality of disk drives in place of that disk drive which contains the second item of data, and the second item of data is read (819). That disk drive which contains the second item of data is redesignated (821) as an available disk drive.

Figure 9:
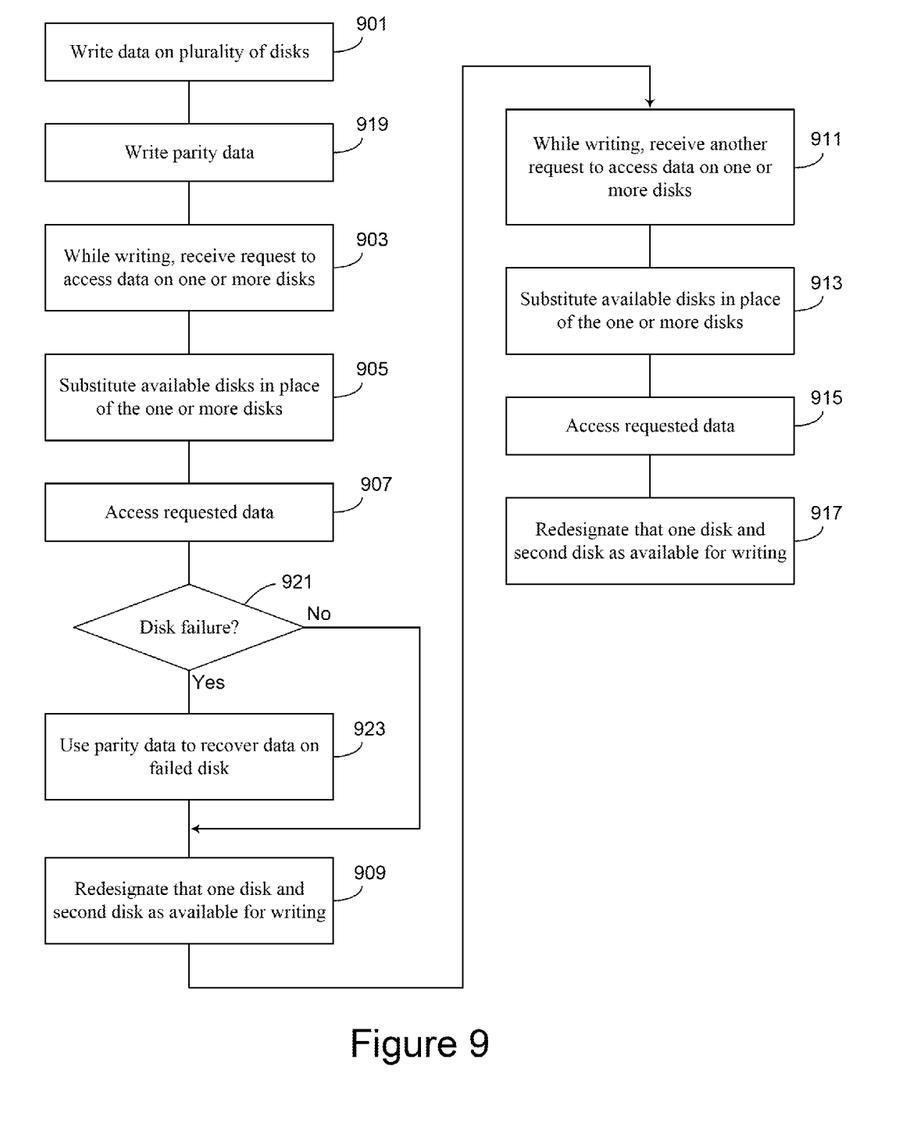
FIG. 9 is a flowchart of another example of a disk-based method of continuously recording multichannel data.

FIG. 9 shows another example of a method of continuously recording multichannel data to disk drives. The method includes writing (901) data on a plurality of disk drives; while writing, receiving (903) a request to access data that has been written to one or more of the disk drives; substituting (905), in the plurality of disk drives, available disk drives in place of the one or more disk drives that contain the requested data; and accessing (907) the requested data.

The method may include, after accessing the requested data, redesignating (909) the one or more disk drives that contain the requested data as available for writing data; while writing, receiving (911) another request to access data that has been written to one or more of the disk drives; substituting (913), in the plurality of disk drives, available disk drives in place of the one or more disk drives that contain the requested data; accessing (915) the requested data; and redesignating (917) the one or more disk drives that contain the requested data as available for writing data.

The method may include writing (919) parity data, for example on an idle disk drive, determining (921) whether there has been a disk drive failure, for example during a read operation, and if so, using (923) parity data to recover data on the failed disk. Recovery may be done by reference to data that has been written to others of the disk drives, and to this end the drives may be grouped into one or more RAID groups before writing data.

As shown by the foregoing examples, parallel data may be logged continuously without having to pause for read operations. This provides very high bandwidth which can be exploited by increasing the rate at which data can be logged or by reducing cost by using fewer disk drives or lower-speed, higher-capacity disk drives.

We claim:

1. Continuous recording multichannel disk-based data logging apparatus comprising:
    a plurality of disk drives;
    an interface including a plurality of parallel inputs and a disk interface device;
    the disk interface device supporting a plurality of channels allocated to a first disk drive belonging to the plurality of disk drives, a maximum number of the plurality of channels determined such that a total bandwidth of the plurality of channels is less than a lowest sustained write rate for the first disk drive;
    the interface responsive to data at the inputs to write the data on an active plurality of the disk drives, at least one disk drive being idle, and
    the interface responsive to a user request for data on one of the active disk drives to substitute an idle disk drive into the active plurality in place of that one, to read the requested data, and to cause that one to become idle.

2. The apparatus of claim 1 wherein the inputs comprise sensor connection ports.

3. The apparatus of claim 1 wherein the inputs comprise data inputs.

4. The apparatus of claim 1 wherein the interface comprises:
    a computer system including a processor in communication with the inputs and the disk drives; and
    instructions that program the processor to write data to the active disk drives, to substitute an idle disk drive in place of one of the active disk drives that contains requested data, and to cause that one to become idle after the requested data has been read.

5. The apparatus of claim 4 wherein an user comprises an application in the computer system.

6. The apparatus of claim 4 wherein an user comprises a remotely-located application, the application in communication with the computer system through a communication port.

7. The apparatus of claim 4 and further comprising instructions that program the processor to write parity data to at least one of the idle disk drives and, in the event of a failure of one of the active disk drives, to use the parity data and data written to others of the disk drives to recover any data on the failed disk drive.

8. The apparatus of claim 1 wherein data is written to blocks on at least one of the active disk drives in an innermost track before data is written to blocks on an outer track.

9. The apparatus of claim 1 wherein previous data written to the innermost track is overwritten when the blocks on the outer track is full.

10. A disk-based method of continuously recording multichannel data comprising:
    writing data on a plurality of disk drives;
    determining a maximum number of channels allocated to a first disk drive belonging to the plurality of disk drives such that a total bandwidth is less than a lowest sustained write rate for the first disk drive;
    receiving a request to read a first item of data;
    substituting, in the plurality of disk drives, an available disk drive in place of that disk drive which contains the first item of data; and
    reading the first item of data.

11. The method of claim 10 and further comprising redesignating that disk drive which contains the first item of data as an available disk drive.

12. The method of claim 10 and further comprising, after receiving the request, identifying that disk drive which contains the first item of data.

13. The method of claim 10 and further comprising:
    receiving a request to read a second item of data;
    substituting, in the plurality of disk drives, a second available disk drive in place of that disk drive which contains the second item of data; and
    reading the second item of data.

14. The method of claim 13 and further comprising redesignating that disk drive which contains the second item of data as an available disk drive.

15. The method of claim 10 and further comprising writing parity data across a plurality of the disk drives onto another one of the disk drives.

16. A method of continuously recording multichannel data to disk drives comprising:
    writing data on a plurality of disk drives;
    determining a maximum number of channels allocated to a first disk drive belonging to the plurality of disk drives such that a total bandwidth is less than a lowest sustained write rate for the first disk drive;
    while writing, receiving a request to access data that has been written to one or more of the disk drives;
    substituting, in the plurality of disk drives, available disk drives in place of the one or more disk drives that contain the requested data; and
    accessing the requested data.

17. The method of claim 16 and further comprising:
    after accessing the requested data, redesignating the one or more disk drives that contain the requested data as available for writing data;
    while writing, receiving a second request to access data that has been written to one or more of the disk drives;
    substituting, in the plurality of disk drives, available disk drives in place of the one or more disk drives that contain the requested data by the second request;
    accessing the requested data by the second request; and
    redesignating the one or more disk drives that contain the requested data by the second request as available for writing data.

* * * * *